INVENTOR
KENNETH J. BRUNINGA

Nov. 11, 1969  K. J. BRUNINGA  3,477,643
SPRINKLER IRRIGATION DEVICE WITH IMPROVED HOSE HANDLING MEANS
AND METHOD OF DEPLOYING THE SAME PREPARATORY TO
A SPRINKLER IRRIGATION CYCLE
Filed Oct. 23, 1967  6 Sheets-Sheet 4

INVENTOR
KENNETH J. BRUNINGA

BY
ATTORNEYS

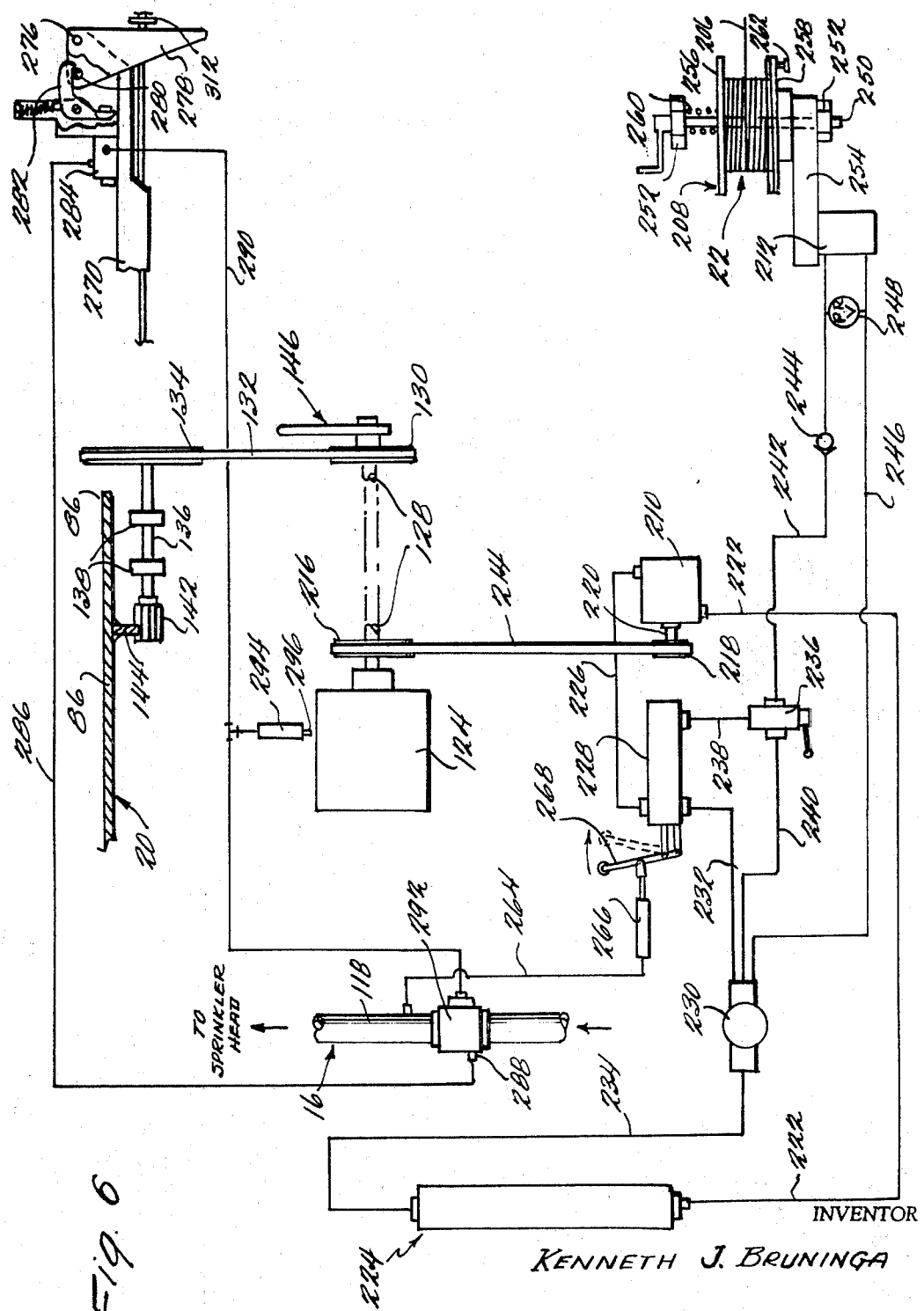

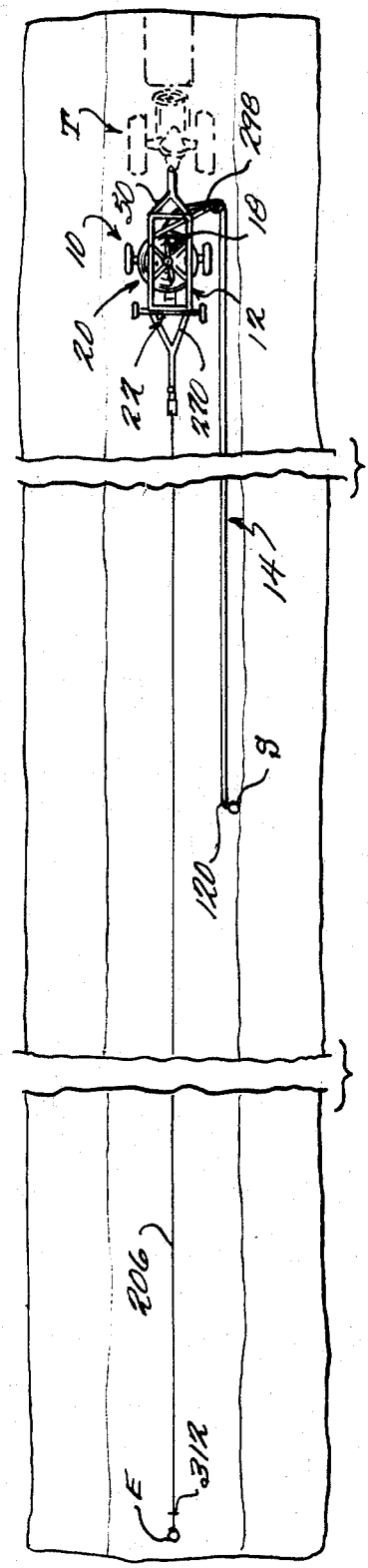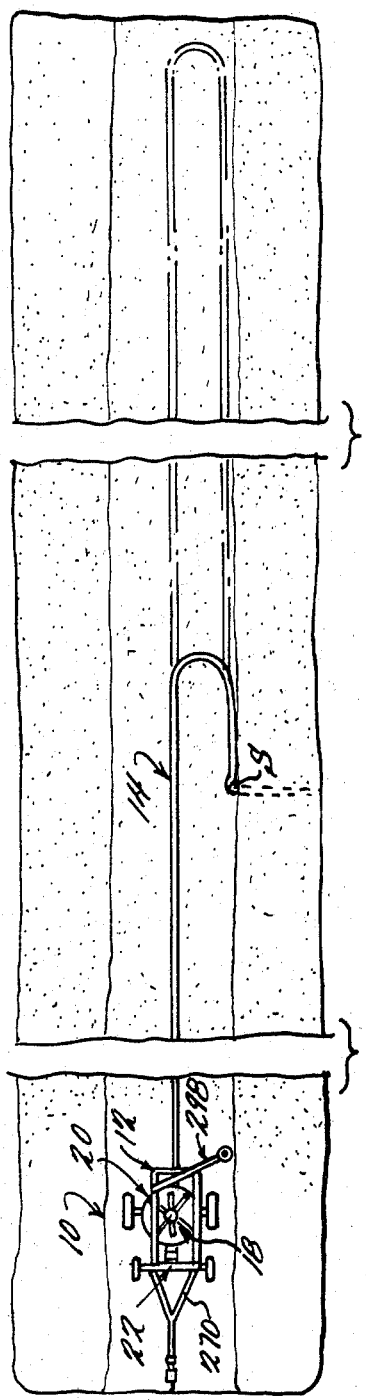

United States Patent Office 3,477,643
Patented Nov. 11, 1969

3,477,643
SPRINKLER IRRIGATION DEVICE WITH IMPROVED HOSE HANDLING MEANS AND METHOD OF DEPLOYING THE SAME PREPARATORY TO A SPRINKLER IRRIGATION CYCLE
Kenneth J. Bruninga, Peoria, Ill., assignor to L. R. Nelson Mfg. Co., Inc., Peoria, Ill., a corporation of Illinois
Filed Oct. 23, 1967, Ser. No. 677,221
Int. Cl. B05b 17/00
U.S. Cl. 239—1             15 Claims

ABSTRACT OF THE DISCLOSURE

The specification discloses a sprinkler irrigation device adapted to be moved along an elongated predetermined path in a sprinkler irrigation cycle during which a source of water under pressure is communicated with sprinkler means on the device by a length of flexible collapsible hose. The sprinkler irrigation device includes a hose reel mounted for power driven rotational movement about a generally vertical axis operable after the irrigation cycle has been completed to wind up the hose in a generally collapsed condition substantially free of contained water in a single coiled formation, while the inner end thereof is connected in communication with the sprinkler means to permit the hose to be conveniently transported with the device from one area to another. The specification also discloses an improved method of deploying the hose and a propelling cable and cable drum assembly preparatory to the irrigation cycle in which the cable is paid out while the device is towed along the path in a properly oriented but reverse direction and the hose is paid out from the hose reel onto the ground parallel to the first portion of the path so as to permit the initiation of the irrigation cycle without the necessity of orienting the direction of the device or in any way changing the connection of the hose therewith.

---

This invention relates to a sprinkler irrigation device of the type adapted to be moved along an elongated predetermined path in a sprinkler irrigation cycle during which a source of water under pressure is communicated with a sprinkler means on the device by a length of flexible collapsible hose and more particularly to a device of this type having improved means for handling the hose for transport with the device from one area to another and to an improved method of deploying the device preparatory to the irrigation cycle.

Traveling sprinklers for use on lawns and somewhat larger areas, such as athletic fields and the like, are well known. The problems of handling a relatively short length of relatively small hose in installations of this type are not severe. Usually, a traveling sprinkler for use on relatively small areas, such as indicated above, utilizes conventional garden hose for communicating the water under pressure from the source to the traveling vehicle carrying the sprinkler head. No particular problem is encountered in handling lengths of garden hose as 100 feet or the like. An example of a traveling sprinkler of this type is disclosed in Nelson Patent 3,043,520, dated July 10, 1962.

When dealing with devices having a capacity sufficient to sprinkler-irrigate agricultural fields, the quantity of water required creates severe problems in communicating the water from the source to the traveling sprinkler. An example of a traveling sprinkler irrigation device of this type is disclosed in Nelson Patent 3,235,009, dated Feb. 15, 1966. The hose utilized with a device of this type may have a length in excess of 600 feet and a diameter of 3 or 4 inches. The combined weight of such a hose, when filled with water, may exceed 2,000 pounds, and consequently the problems of handling such hose in conjunction with a moving vehicle can become quite severe.

In accordance with the disclosure contained in Nelson Patent 3,235,009, a 600-foot length of hose is utilized during the sprinkler irrigation cycle by connecting one end thereof with the source of water under pressure and extending the hose outwardly from the source along the ground for connection with the sprinkler vehicle. During the irrigation cycle, the sprinkler vehicle moves along a path including a first portion extending in a direction generally parallel with the hose and toward the water source, and a second portion extending in generally the same direction but away from the source. By deploying the hose in this manner during the irrigation cycle, a total travel path of approximately twice the length of the hose utilized can be obtained.

After the irrigation cycle has been completed and the sprinkler vehicle has moved through its entire operative path, the device must then be moved to a new area to be sprinkled. In accordance with the teachings of Nelson Patent 3,235,009, the vehicle is provided with a hose reel around which the hose is wound in a generally collapsed condition substantially free of contained water. In this compact bundle formation, the hose is conveniently carried by the vehicle for transport to a new area to be sprinkler-irrigated.

An object of the present invention is the provision of a device of the type described having improved hose reel means mounted for rotation about a generally vertical axis around which the hose is wound in a generally collapsed condition substantially free of contained water for convenient transport with the vehicle to a new area to be sprinkler irrigated.

Another object of the present invention is the provision of a device of the type described having an improved hose reel means which permits the hose to be connected with the conduit means leading to the sprinkler means in such a manner as to obtain optimum flow characteristics during the irrigation cycle, and which permits the hose to be wound up after the irrigation cycle has been completed without the necessity of changing the connection of the hose end adjacent the vehicle.

Another object of the present invention is the provision of a device of the type described including an improved vehicle construction which permits the sprinkler vehicle to be initially deployed for an irrigation cycle without the necessity of changing the connection of the hose end to the vehicle or reversing the direction of orientation of the sprinkler vehicle.

Another object of the present invention is the provision of a device of the type described including an internal combustion engine which serves not only as a source of power for rotating the hose reel to wind up the hose, but also as a source of power to effect propulsion of the vehicle during the irrigation cycle.

A further object of the present invention is the provision of a device of the type described which is simple in construction, effective in operation, and economical to manufacture and maintain.

Another object of the present invention is a method of deploying a device of the type described which is propelled during the irrigation cycle by means of a cable and cable drum assembly in which the cable is paid out while the device is towed along the path in a properly oriented but reverse direction and the hose is paid out from the hose reel onto the ground parallel to the first portion of the path so as to permit the initiation of the irrigation cycle without the necessity of orienting the direction of the device or in any way changing the connection of the hose therewith.

These and other objects of the present invention will become more apparent during the course of the following detailed description and appended claims.

The invention may best be understood with reference to the accompanying drawings wherein an illustrative embodiment is shown.

In the drawings:

FIGURE 6 is a diagrammatic view of the power-driven propulsion system of the device;

FIGURE 7 is a top plan view illustrating a step in the method of deploying the device preparatory to an irrigation cycle embodying the principles of the present invention; and FIGURE 8 is a view similar to FIGURE 7 illustrating the manner in which the device is operated during an irrigation cycle.

Figure 1:
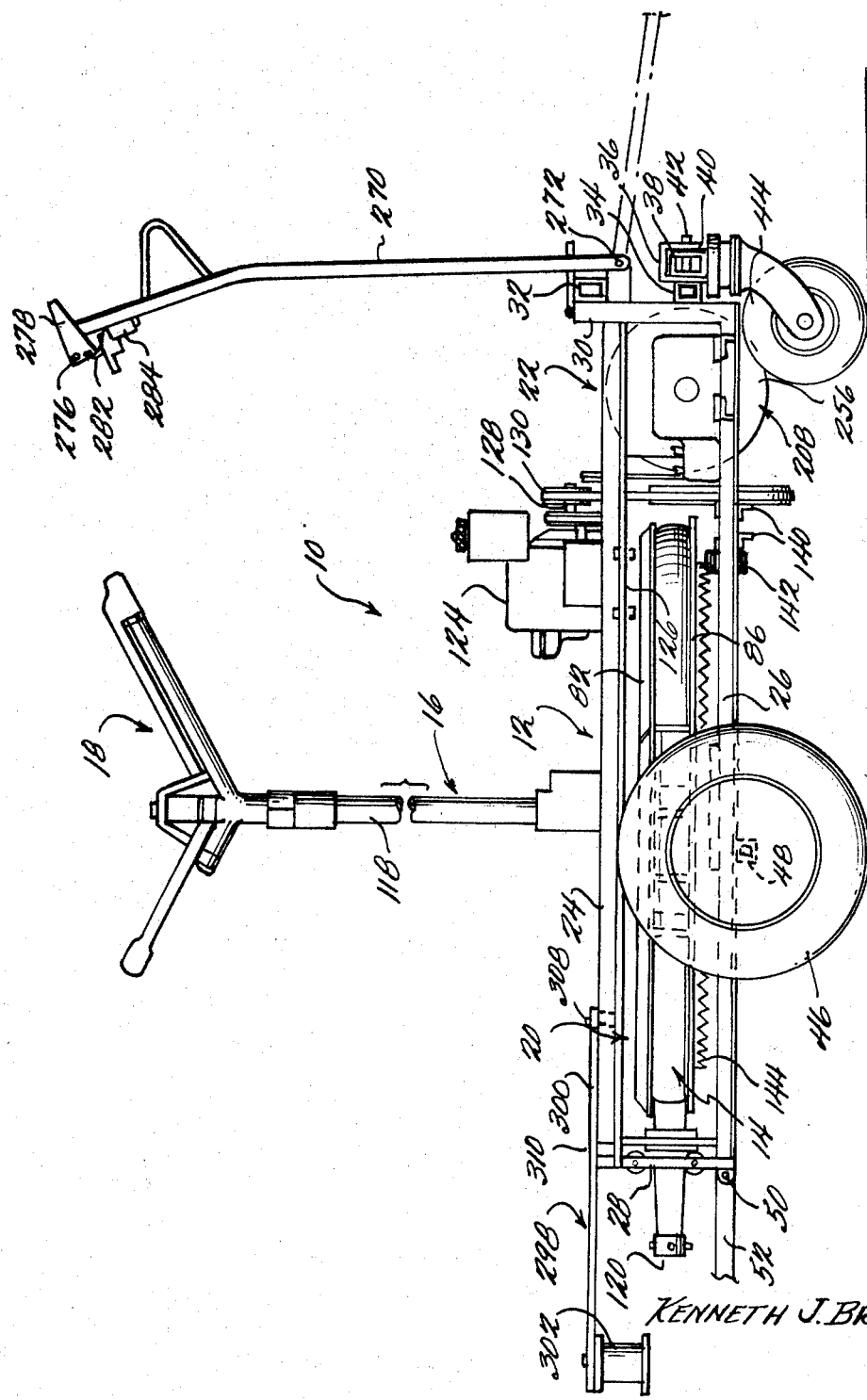
FIGURE 1 is a side elevational view of a traveling sprinkler-irrigation device embodying the principles of the present invention.
Figure 2:
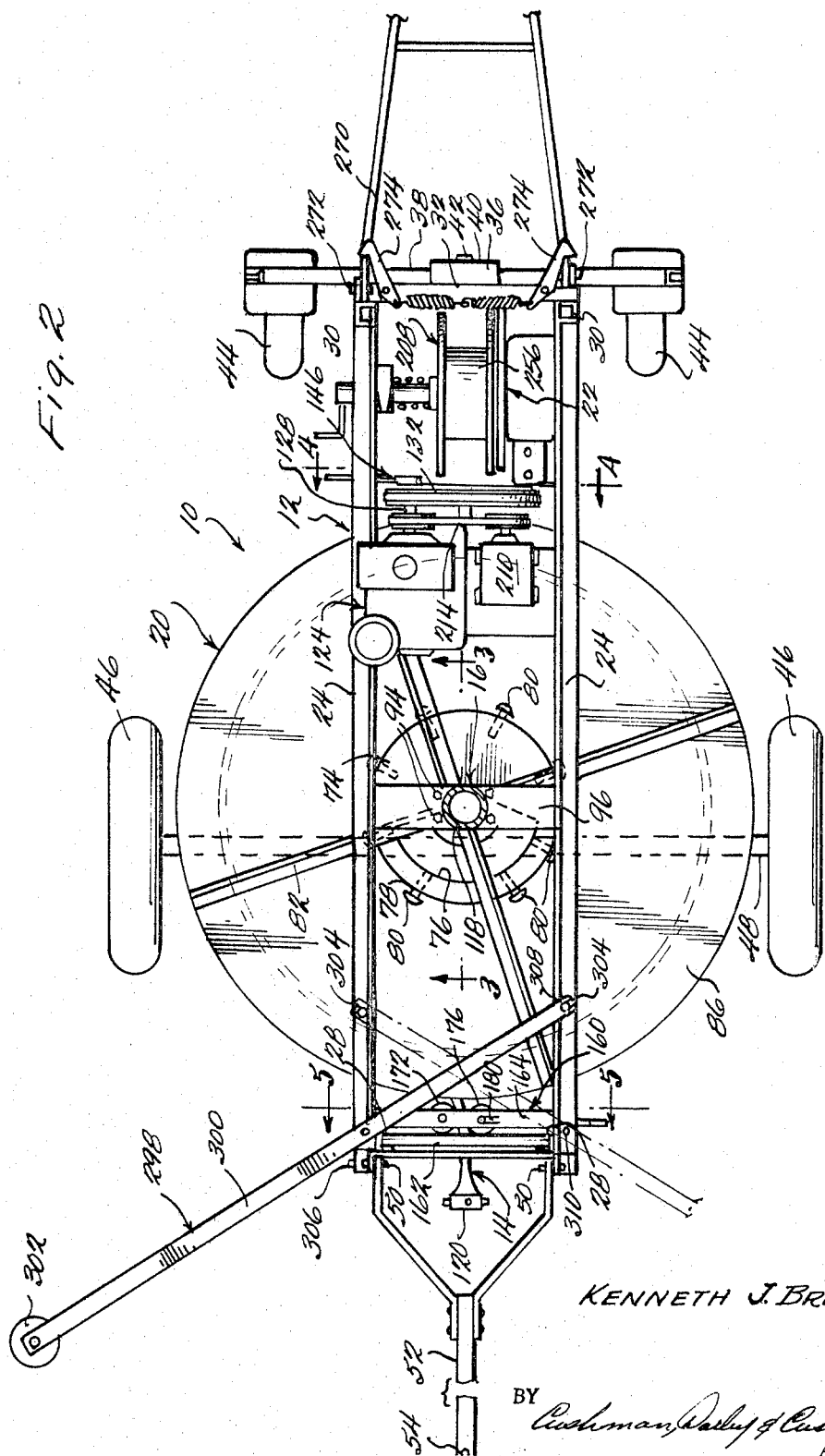
FIGURE 2 is a top plan view of the device.

Referring now more particularly to the drawings, there is shown in FIGURES 1 and 2 a traveling sprinkler-irrigation device, generally indicated at 10, embodying the principles of the present invention. In general, the device includes a vehicle frame means, generally indicated at 12, a length of flexible, collapsible hose, generally indicated at 14, conduit means, generally indicated at 16, carried by the vehicle frame means and having an inlet opening connected with one end of the hose, and sprinkler means, generally indicated at 18, communicating with the conduit means 16 for distributing water flowing through the hose 14 into the conduit means 16 onto the area to be sprinkler-irrigated.

A device 10 of the present invention also includes a hose reel assembly, generally indicated at 20, carried by the vehicle frame means 12 and operatively associated with the conduit means 16 for power-operated rotational movement about a generally vertical axis to effect the winding up of the hose in generally vertical axis to effect the winding up of the hose in generally collapsed condition substantially free of contained water after the irrigation cycle has been completed, without the need to in any way disturb the connection between the hose 14 and the conduit means 16.

Operatively associated with the vehicle frame means 12 is a frame moving and guiding means or propulsion means, generally indicated at 22, for propelling the device along a guided path during the irrigation cycle.

The vehicle frame means 12 may be of any suitable construction and, as shown, is in the form of a skeletonized box-like structure made up of conventional structural steel frame members, such as angle irons or the like, including a pair of upper longitudinally extending parallel side frame members 24 and a pair of lower longitudinally extending parallel side frame members 26. The rear ends of each corresponding pair of upper and lower side frame members 24 and 26 are rigidly interconnected by vertically extending corner members 28 and the forward ends thereof are rigidly interconnected by a pair of front vertical corner members 30. As best shown in FIGURE 1, an upper front cross brace member 32 is rigidly connected across the upper ends of the vertical members 30, and a lower cross brace member 34 is rigidly secured across the lower portion of the vertical members 30.

Fixedly secured to the central portion of the lower cross brace 34 is a generally C-shaped member 36 within which the central portion of a transversely extending wheel-carrying member 38 is disposed. A vertical plate 40 is secured to the ends of the C-shaped member 36 and a horizontal, longitudinally extending pivot pin 42 is mounted in the plate and the central portion of the C-shaped member and extends through the central portion of the transverse wheel-carrying member 38 so as to mount the latter for swinging movement in a generally vertical plane. Carried by the outer ends of the wheel-carrying member 38 is a pair of caster wheels 44 of conventional construction. The rearward portion of the frame is supported by a pair of transversely spaced wheels 46 carried by a fixed axle 48 fixedly secured to the underside of the central rearward portion of the lower longitudinally extending frame members 26.

The rear ends of the lower longitudinally extending frame members 26 extend rearwardly beyond the vertical rear corner members 28 and are pivotally connected, as by pivot pins 50, to the bifurcated end of a draft tongue 52 having a tractor clevis or hitch 54 (FIGURE 2) at its opposite end.

Figure 3:
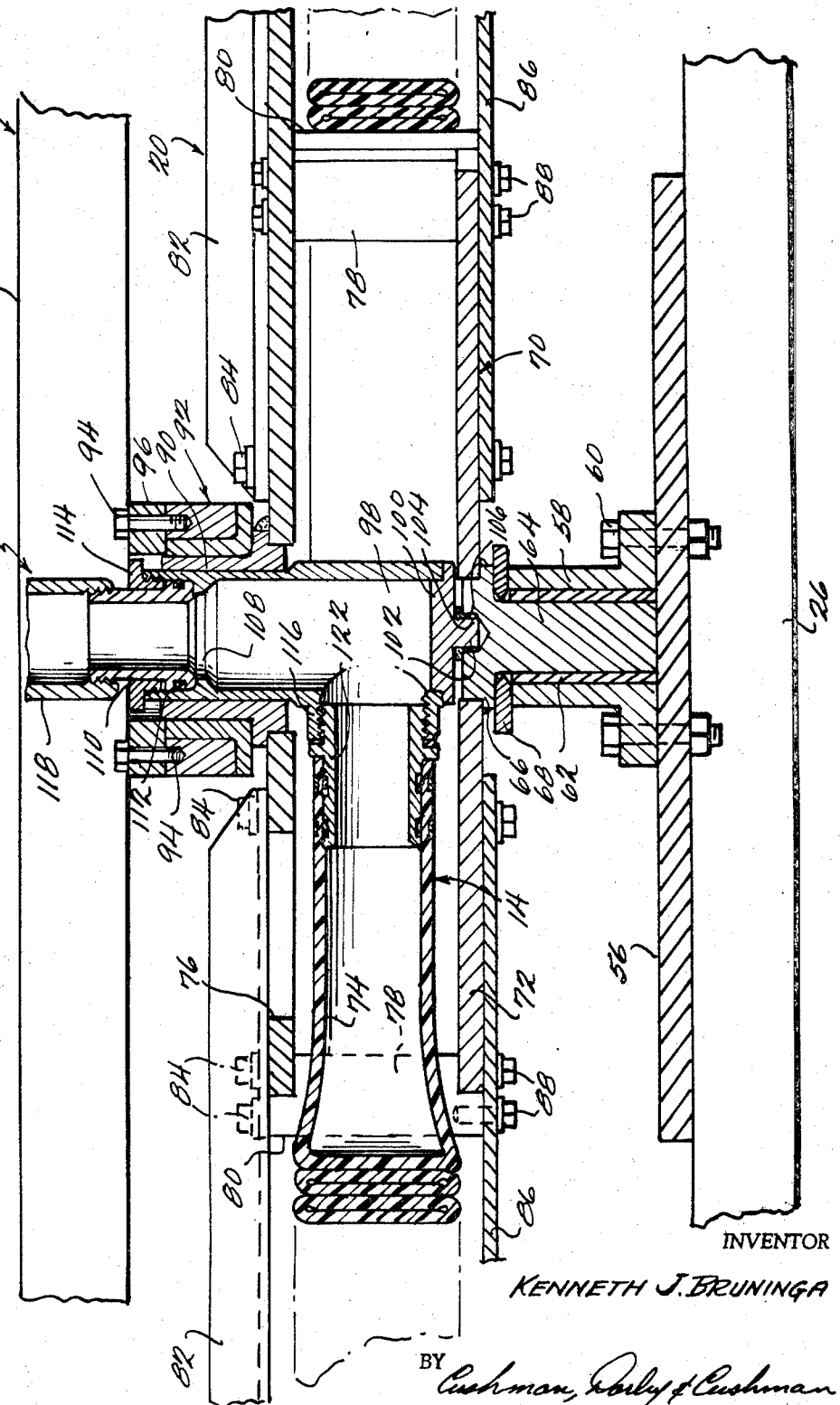
FIGURE 3 is an enlarged fragmentary sectional view taken along the line 3—3 of FIGURE 2.

FIGURE 3 best illustrates the cooperating relationship between the conduit means 16 and the hose reel means 20 of the present invention and the manner in which these assemblies are mounted on the vehicle frame means 12. As shown in FIGURE 3, a heavy mounting plate 56 is fixedly secured across the upper central surface of the lower longitudinally extending frame members 26 and has a flanged bearing element 58 detachably secured to the upper central portion thereof, as by bolts 60 or the like. Mounted within the flanged bearing element 58 is a sleeve bearing 62 for rotatably receiving a shaft element 64. The upper end of the shaft element includes a radially outwardly extending flange 66, the lower surface of which engages a disc-bearing element 68 mounted on the upper end of the bearing element 58.

The shaft 64 forms a part of a hub structure 70 of the hose reel means 20. The hub structure 70 includes a lower disc member 72 fixedly secured to the flange portion 66, as by welding or the like, and a parallel spaced upper disc member 74 having an arcuate access opening 76 formed therein. The outer peripheries of the disc members 72 and 74 are secured together in fixed spaced relation by a series of circumferentially spaced or annularly arranged radially extending bar elements 78. The outer portions of the bar elements 78 are provided with enlarged arcuate surfaces 80 for receiving the initial loop of the hose during the winding thereof around the hub structure (FIGURE 2).

The hose reel means 20 also includes upper and lower side structures which serve to maintain the hose in a single coil formation during winding. The upper side frame structure is preferably in the form of a plurality of radially extending arms 82 fixedly secured at their inner ends to the associated bar members 78 and upper disc member 74, as by bolts 84. The lower side structure is preferably in the form of an enlarged disc 86 secured beneath the lower disc member 78 and to the associated bar members 78, as by bolts 88.

The upper disc member 74 is fixedly secured, as by welding or the like, to the lower flange of a sleeve member 90 which is interiorly journaled within a sleeve bearing assembly 92 fixedly secured, as by bolts 94, to the central portion of a centrally apertured cross brace 96 having its ends secured across the under side of the upper frame members 24.

The conduit means 16 includes a lower pipe section 98 closed at its lower end by a plug 100 having a stud 102 extending downwardly from the central portion thereof. An aperture 104 is formed in the upper central portion of shaft 64 for receiving a flanged bearing 106 which in turn receives the stud 102 and serves to rotatably support the pipe section 98 for independent swiveling movement about a generally vertical axis which is coincident with the axis of rotation of the hose reel means 20. The upper end portion of the pipe section 98 is of reduced diameter and is journaled within the flanged sleeve 90 associated with the upper disc member 74 of the hose reel hub structure.

Formed in the interior of the pipe section 98 adjacent its upper end portion is an inwardly extending annular flange 108 for receiving the lower end of a tubular swivel pipe fitting 110. The pipe fitting 110 includes a lower outwardly extending flange grooved to receive an O-ring seal 112 which provides a watertight seal between the exterior of the fitting 110 and the interior of the pipe section 98. The swivel fitting 110 is rotatably retained within the upper end portion of the pipe section 98 by means of a flanged sleeve plug 114.

Formed on the lower end of the pipe section 98 is a generally horizontally extending tubular section 116 which defines an inlet opening for the conduit means 16 through which water flowing in the hose 14 enters the interior of the pipe section 98. The conduit 16 also includes an upstanding vertical pipe section 118 suitably secured at its lower end to the upper end of the swivel fitting 110 through which water from the pipe section 98 flows upwardly.

The sprinkler means 18 is mounted on the upper end of the upstanding pipe section 118 so that water flowing through the pipe section 118 will be distributed by the sprinkler means 18 outwardly onto the area to be sprinkler-irrigated. The sprinkler means 18 may be of conventional construction and preferably is of the step-by-step rotary type having the capability of covering either a 360° circular pattern or a segmental pattern of any desired arcuate extent less than 360°. An exemplary embodiment of a sprinkler of this type is disclosed in Patent No. 3,022,012. It will be understood that the term sprinkler means comprehends within its meaning a single sprinkler head of any conventional type as well as plural sprinkler head arrangements, as, for example a boom with individual sprinkler heads or nozzles located along the boom.

The hose 14 is preferably of the flexible, collapsible type disclosed in the aforesaid Nelson Patent No. 3,235,009, the outer end of which is provided with a conventional detachable coupling 120. The detachable coupling 120 is provided on the outer end of the hose 14 for connection with a suitable source of water under pressure disposed within the area to be sprinkler-irrigated. Such a source is illustrated at S in FIGURES 7 and 8. In accordance with conventional practice, the outlet of the source S is provided with a coupling which is adapted to cooperate with the coupling 120. The inner end of the hose 14 is connected with the tubular section 116 by a sleeve fitting 122.

Figure 4:
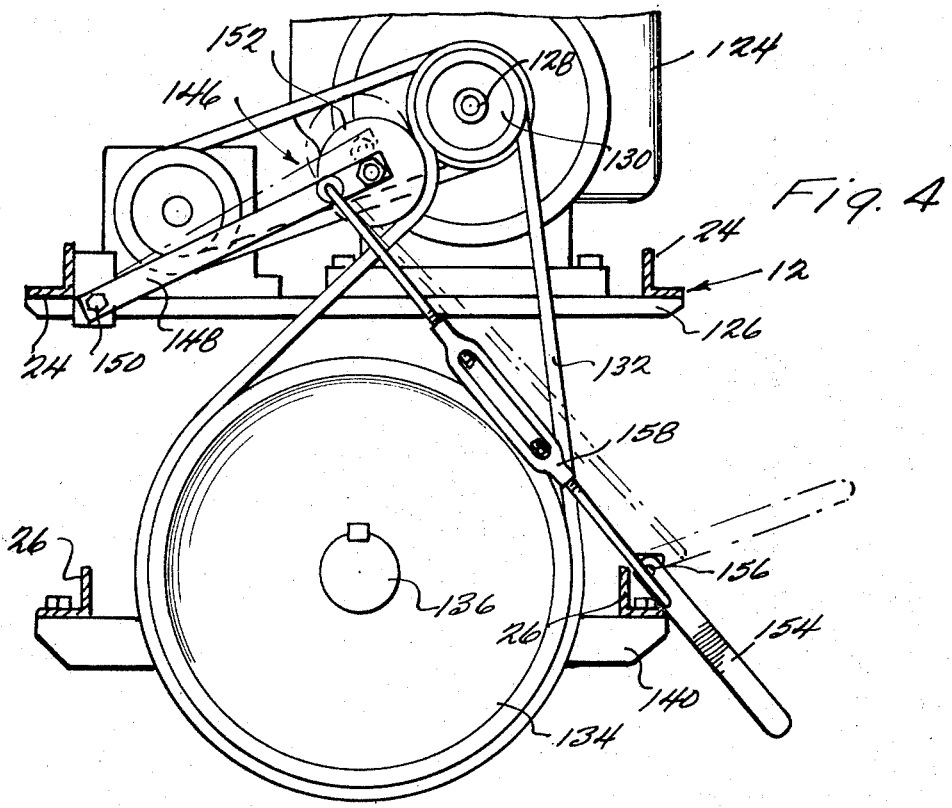
FIGURE 4 is an enlarged fragmentary sectional view taken along the line 4—4 of FIGURE 2.

Power operated means is provided for effecting rotational movement of the hose reel means 20 to wind up the hose 14 thereon with the inner end thereof connected with the conduit means 16. The power operated means preferably is in the form of an internal combustion engine 124 of conventional design suitably mounted on the underside of the upper frame members 24, as by a bracket 126, and having an output shaft 128 extending forwardly therefrom. As best shown in FIGURE 4, a pulley 130 is fixed to the outer end portion of the shaft 128 which serves to selectively drive a belt 132. The belt 132 is trained about the pulley 130 and about a larger pulley 134 fixed to one end of a shaft 136 journaled in spaced bearings 138 mounted on the central portion of a pair of cross braces 140 suitably fixed across the underside of the lower frame members 26. Fxed to the end of the shaft 136 beyond the bearings 138 is a spur gear 142 adapted to mesh with a crown gear 144 fixedly secured in depending relation to the underside of the disc 86.

As best shown in FIGURE 4, the belt 132 is selectively drivingly engaged with the drive pulley 130 by means of a belt tightener assembly, generally indicated at 146. The belt tightener assembly includes an arm 148 pivotally mounted at one end adjacent one of the upper frame members 24, as indicated at 150, and having a belt engaging wheel 152 journaled on its opposite end. The periphery of the wheel 152 engages the outer periphery of the belt 132 and when moved from the dotted line position shown in FIGURE 4 to the full line position, serves to tension the belt so as to effect a driving connection between the pulleys 130 and 134. The wheel 152 is moved between its inoperative dotted line position to its operative full line position by an actuating lever 154 pivoted at one end adjacent the opposite lower longitudinal frame member 26, as indicated at 156, and an adjustable connecting link 158 pivotally connected at its ends to the lever 154 and mounting arm 148, respectively. It will be noted that when the lever is moved from its inoperative dotted line position as shown in FIGURE 4 to its operative full line position as shown in FIGURE 4, the pivotal connection of the adjustable connecting link 158 with the lever 154 moves over center so as to maintain the roller 152 in its operative position until positively moved back into its inoperative position by manual actuation of the actuating lever 154.

An important functional attribute of the belt tightener assembly 146 is the capability of providing frictional drag preventing unrestricted free turning movement of the hose reel when the belt tightener assembly is in its inoperative position. Other types of belt tightener assemblies may be utilized having equivalent functional capabilities as, for example, an assembly movable between operative and inoperative positions by effecting relative axial movement between cooperating split pully elements toward and away from each other respectively. Moreover other clutching arrangements providing equivalent capabilities may also be utilized.

Figure 5:
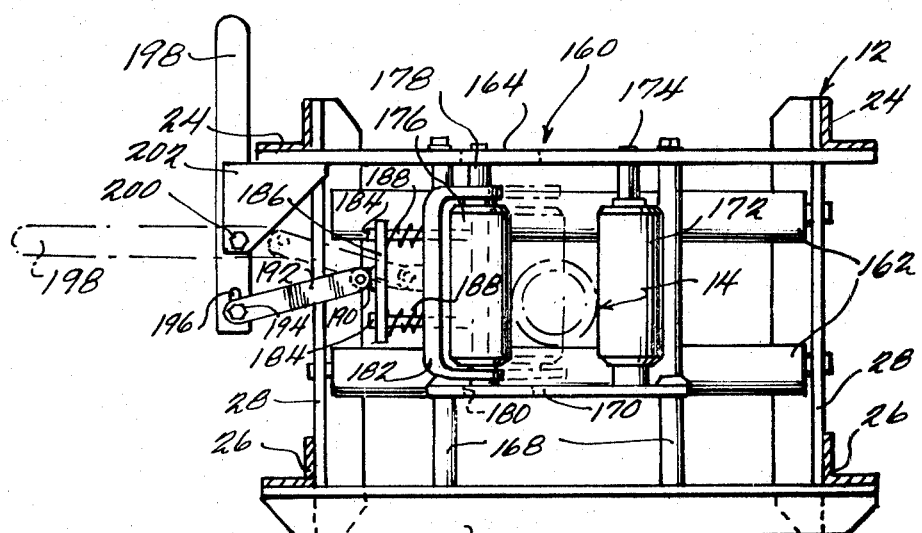
FIGURE 5 is an enlarged fragmentary sectional view taken along the line 5—5 of FIGURE 2.

Referring now more particularly to FIGURE 5, there is shown therein a hose guiding and collapsing mechanism, generally indicated at 160. The mechanism 160 serves to guide and collapse the hose 14 during the rotation of the hose reel means 20 to wind up the hose thereon. The mechanism 160 is provided to insure the collapse of the hose and expulsion of substantially all contained water therein during the winding of the hose around the hub structure under all operating conditions. It will be understood that where the contour of the area to be sprinkler-irrigated is such that after the irrigation cycle has been completed and the hose is disconnected from the source, water in the hose will run out by gravity, it would not be essential to utilize mechanism 160. The pull on the hose in response to the rotation of the hose reel means where no mechanism 160 is provided will effect a collapse of the hose as it is wound, and this collapsing action would serve to expel any contained water within the hose which does not have too much resistance to flow by virtue of the contour of the ground upon which the hose rests. Moreover, where the device is set up to operate through a path in which the second portion of the run terminates at a position substantially less than the full length of the hose, the bend remaining in the hose as the winding begins may form a kink in the hose trapping the water therein. Thus, the provision of a collapsing and guiding mechanism 160 is desirable to insure the proper collapse and expulsion of contained water under all conditions.

As best shown in FIGURE 5, the hose guiding and collapsing mechanism 160 includes a pair of vertically spaced horizontally extending rear guide rollers 162 suitably journaled between the rear vertical corner frame members 28. Mounted forwardly of the rear vertical frame members 28 is a pair of upper and lower cross brace members 164 and 166 fixedly secured across the upper and lower longitudinal frame members 24 and 26, respectively. A pair of transversely spaced rods 168 is suitably secured between the central portions of the upper and lower cross braces 164 and 166, the rods having a horizontally extending bar 170 fixedly secured therebetween.

A first vertical roller 172 is journaled on a shaft 174 having its end mounted respectively in the upper cross brace 164 and the horizontally extending bar 170. A second transversely movable, vertical roller 176 is journaled on a shaft 178 having its ends slidably mounted in transverse slots 180 formed respectively in the upper cross brace 164 and the bar member 170 (see FIGURE 2). The ends of the shaft 178 also extend through the legs of a yoke 182 the bright portion of which has a pair of studs 184 fixedly secured thereto and extending horizontally outwardly therefrom. The studs 184 extend through an apertured plate 186 which is resiliently baised away from the yoke by means of coil springs 188 surrounding the studs with their ends contacting the plate 186 and yoke 182, respectively.

The central portion of the plate 186 is pivotally connected, as at 190, with one end of a connecting link 192, the opposite end of which is provided with a pivot pin 194. The pivot pin 194 engages within an elongated slot 196 formed in one end of an actuating lever 198 pivotally connected, as indictaed at 200, with a bracket 202 fixed to the adjacent end of the cross brace 164.

It will be seen that when the actuating lever 198 is moved from the solid line position shown in FIGURE 5 to the dotted line position shown therein, the movable vertical roller 178 will be moved from a position spaced from the vertical roller 172 to a position adjacent the roller 172. Moreover, the position of the pivot pin 194 is such as to move into an overcenter relation with respect to the pivots 190 and 200, so as to maintain the roller in adjacent position until the lever is positively moved by manual actuation. When the roller 178 is disposed adjacent the roller 172, a resilient squeezing action is applied to the hose which positively serves to collapse the hose and expel substantially all of the water contained therein as a hose passes between the rollers.

The frame moving and guiding means 22 may include any of the arrangements known in the art, such as for example, the moving and guiding arrangement disclosed in either of the aforesaid Nelson patents. However, as shown, the moving and guiding means 22 preferably is of the cable reel type including a length of cable 206 having one end arranged to be anchored to the ground and its opposite end wound around a cable drum assembly, generally indicated at 208. In the preferred arrangement, as best shown in FIGURE 6, the cable drum assembly 208 is arranged to be selectively driven by the internal combustion engine 124 through a hydraulic circuit including a hydraulic pump 210 and a hydraulic motor 212.

As best shown in FIGURE 6, the hydraulic pump 210 is driven by the internal combustion engine 124 through a suitable motion transmitting assembly, such as a endless belt 214 trained about a pulley 216 fixed to the output shaft 128 of the engine and a pulley 218 fixed to an input shaft 220 of the hydraulic pump 210.

The hydraulic pump 210 has an inlet line 222 connected therewith which communicates with a hydraulic reservoir or pump 224 and a outlet line 226 which communicates with a main control valve 228. The control valve 228 may be of any conventional construction and, as shown, is a two-position valve, which is operable in one position to direct fluid in the pump outlet line 226 back to the reservoir 224 through a filter 230, as by lines 232 and 234 in series with the filter 230. In its second position, the control valve 228 is operable to direct the fluid from the pump outlet line 226 to a pressure compensated flow control valve 236, as by a line 238. The valve 236 may also be of conventional construction and is arranged to be manually set to provide any desired output flow within a given range irrespective of the speed of the internal combustion engine 124. To this end, the valve 236 has a bypass line 240 connected therewith which leads to the hydraulic reservoir 224 through the filter 230 and an output line 242 which leads to the hydraulic motor 212. Preferably, a check valve 244 is provided in the line 242 to prevent a back flow.

The hydraulic circuit of the hydraulic motor 212 is completed by a return line 246 which communicates with the filter 230. Preferably, a pressure relief valve 248 is connected across the lines 242 and 246 in a position to bypass the hydraulic motor 212 in the event that the hydraulic pressure in the line 242 should exceed a predetermined value.

The cable drum assembly 208 includes a main shaft 250 suitably journaled on the vehicle frame means 12 as by a pair of bearings 252. The shaft 250 is drivingly connected with the hydraulic motor 212 as by a gear reduction unit 254 of any suitable conventional construction. Journaled on the shaft 250 is a conventional cable drum 256 having one of its side discs mounted in engagement with a friction disc 258 fixedly secured to the shaft 250. The cable drum 256 is urged into frictional engagement with the friction disc 258 by any suitable means, such as a coil spring 260 or the like surrounding the shaft 250 and positioned between the cable drum 256 and the adjacent bearing 252. The frictional engagement of the cable drum 256 with the disc 258 serves to prevent free rotation of the cable drum during the payout operation of the cable.

Means is provided for positively locking the cable drum 256 with the disc 258 for the purpose of winding up the cable on the cable drum during the irrigation cycle. As shown, such means may include a locking pin 262 carried by the disc 258 and arranged to be selectively engaged within an aperture formed in the adjacent end disc of the cable drum 256.

The above described arrangement for selectively driving the cable drum and permitting controlled frictional rotation thereof is exemplary only. Other arrangements having equivalent functional capabilities may be utilized.

Preferably, the main control valve 228 serves to control the operation of the hydraulic motor 212 and hence the rotation of the cable drum asembly 208 is controlled in response to the communication of water under pressure to the conduit means 16 and sprinkler head means 18 carried thereby.

To this end, a water line 264 is connected at one end with the vertical pipe section 118 of the conduit means 16 and at its other end with a single acting spring return piston and cylinder unit 266. The piston and cylinder unit 266 is connected with an actuating lever 268 of the control valve 228 so that when water under pressure is contained within the conduit means 16, the piston and cylinder unit 266 will be actuated through the water under pressure in line 264 communicating with the conduit means 16. When piston and cylinder unit 266 is actuated, the actuating lever 268 is maintained in the dotted line position shown in FIGURE 6, which maintains the control valve 228 in a position to connect the pump outlet line 222 with the line 238 leading to the hydraulic motor 212 through the flow control valve 236 and check valve 234. When the source of water under pressure to the conduit means 16 is shut off, piston and cylinder unit 266 will return the actuating valve 268 to the solid line position shown in FIGURE 6 wherein the control valve 228 is positioned to connect the pump outlet line 226 with the hydraulic reservoir 224 thus bypassing the operation of the hydraulic motor 212 and the cable drum assembly 208.

Preferably, means is provided for shutting off the flow of water under pressure through the conduit means 16 when the vehicle frame means has reached the end of its guided path of movement during the irrigation cycle so that no further water will be distributed through the sprinkler head means 18. To this end, an elongated cable follower arm 270 is provided having its bifurcated rear end pivotally connected with the forward end of the frame means as by horizontally extending pivot pins 272. In this way, the arm 270 is mounted for swinging movement in a generally vertical plane between an upright inoperative position, wherein the arm is selectively retained, as by spring pressed latch elements 274, and an operative, generally horizontally extending position.

While the above arrangement is preferred, it is within the contemplation of the present invention to mount the cable follower arm 270 on the vehicle frame for pivotal movement about a vertical axis as well and utilize this pivotal movement to guide the adjacent wheels in the same fashion as a wagon tongue.

Pivotally mounted on the outer end of the arm 270, as indicated at 276 in FIGURE 6, is a cable engaging lever 278. As best shown in FIGURE 6, the lever 278 is in the form of a pair of transversely spaced horizontally extending parallel triangular plates, one corner portion of which extends downwardly from the pivot 276 and receives the cable therebetween. Another corner portion of the lever 278 extends rearwardly from the pivot 276 and is provided with a pin 280 disposed in engagement with one arm of a spring pressed over center valve actuated lever 282 of conventional construction, the opposite end of which is connected to a trip valve 284. The avlve 284 is of conventional construction constituting a simple two-position valve which, in its operative position, serves to connect a water line 286 communicating with the pipe section 118 of the conduit means 16, as indicated at 288 with a water line 290 which serves to provide pilot pressure for actuating a pilot pressure operated shut-off valve 292 mounted within the pipe section 118 of the conduit means 16 between the connection of the lines 264 and 286 therewith. The line 290 has connected in parallel therewith a single acting spring return piston and cylinder unit 294, the piston of which is connected to actuate a engine shut-off element 296 which serves to ground out the electrical system of the internal combustion engine 124 and hence shut off the operation thereof.

OPERATION

The method by which the sprinkler irrigation device 10 of the present invention is manipulated or deployed preparatory to an irrigation cycle is an important aspect of the present invention as it involves a minimum effort and the time required to effect these manipulations is reduced to a minimum thus constituting a substantial improvement over the systems heretofore proposed which utilize essentially the same type of irrigation cycle. It is of primary importance to note that when the hose 14 is wound up on the hose reel means 22, the inner end of the hose is connected in watertight communication with the conduit means 16 of the device and this connection need not be disturbed at any time prior to the actual operation of the irrigation cycle.

In describing the manipulations of the present sprinkler irrigation device necessary prior to the initiation of the irrigation cycle, it will be assumed that the device is initially in a condition with the hose 14 wound upon the hose reel means 20 in a generally collapsed condition substantially free of contained water. The operation is commenced by connecting the draft tongue 52 to the draw bar of a towing vehicle, such as a tractor shown in FIGURE 7. The device 10 is then towed to a position E in in the field corresponding to the end of the path of travel during the irrigation cycle. At the position E a suitable earth anchor is engaged with in the ground and the free end of the cable 206 is connected to the earth anchor. The locking pin 262 of the cable drum assembly 208 is disengaged to permit the cable drum 256 to have free frictional rotational movement.

Next, the device 10 is towed by the tractor T in a direction toward the water source S during which movement of the cable 206 is paid out fromt he cable reel 256 by a controlled rotation of the latter in response to the movement of the device 10. When the tractor operator reaches a position adjacent the source S, the tractor is stopped and, after insuring that the belt tightener assembly 146 is disposed in its inoperative position (shown in dotted line in FIGURE 4) the hose is pulled outwardly by the operator. In this regard it will be noted that when the belt tightener assembly 146 is disposed in its inoperative position the hose reel means 20 is free to rotate with a controlled frictional drag provided by the frictional engagement of the belt with the pulley 134.

Preferably, a hose payout guide, generally indicated at 298, is utilized to assist in paying out the hose preparatory to the irrigation cycle. As best shown in FIGURE 2, the payout guide includes an elongated bar 300 having a hose engaging guide roller 302 journaled on its outer end, an elongated slot 304 at its inner end and a transverse slot 306 intermediate its end. The hose payout guide is mounted adjacent the rear end portion of the vehicle frame means 12 to extend generally laterally rearwardly to either side of the vehicle frame means 12. To this end, a pair of pins 308 are fixed to the upper frame members 24 at positions spaced forwardly thereof and a second pair of pins 310 is rigidly fixed to the rear ends of the frame members 24. The hose payout guide 298 is maintained in position by engaging the end slot 304 on the pin 308 and the intermediate transverse slot 306 on the pin 310.

With the hose payout guide 298 positioned at the rear end portion of the vehicle frame means (the forward portion with respect to the direction of tow by the tractor T), the operator pulls the end of the hose outwardly through the roller guides 172 and 176 (the latter being disposed in its outermost full line position as shown in FIGURE 5) around the payout roller 302 and then connects the end coupling 120 of the hose to the water source S. When this connection has been effected the operator gets back into the tractor and tows the device 10 away from the source S to the starting position of the irrigation cycle. It will be noted that during this movement both the cable 206 and the hose 14 are simultaneously paid out from their respective reels or drums with a frictional controlled rotation as the device 10 is moved. It will also be noted that when the tractor T has moved to its starting position, the vehicle frame means 12 is properly oriented and need not have its direction reversed as is the case with the vehicle frame means as disclosed in the aforesaid Nelson Patent No. 3,205,009.

With the device 10 at its starting position, the operator then disconnects clevis 54 from the tractor draw bar and moves the tongue 52 into an upright inoperative position. Next, the lock 262 of the cable drum assembly 208 is engaged and internal combustion engine 124 is started. The operator then gets back onto the tractor and drives around to the source S or to another position of control, where a control valve (not shown) is opened so that the water at the source S flows into the hose. Water in the hose flows into the conduit means 16 and out of the sprinkler means 18 which serves to distribute the water to the area to be sprinkler-irrigated. The water under pressure within the conduit means 16 communicating with the line 264 actuates the piston and cylinder unit 266 which, in turn, moves the control valve 228 from its inoperative position (as shown in solid lines in FIGURE 6) to its operative position (as shown in dotted lines in FIGURE 6). The movement of the control valve 228 into its operative position directs the flow of hydraulic fluid in the pump output line 226 through the hydraulic motor 212 thus commencing the rotational movement of the cable drum 256 to wind up the cable 206 thereon.

In this way, the irrigation cycle of the present sprinkler irrigation device is initiated in response to the communication of water under pressure with the hose 14. As the cable 206 is wound up on the cable drum 256 the vehicle frame means 12 will be moved toward the end of the cable at position E. This movement will continue through a total irrigation cycle path which includes a fixed portion extending from the starting position toward the source S and a second portion extending generally in the same direction but away from the source toward the position E. During this movement, the end portion of the hose with water under pressure flowing therein is pulled to the rear of the vehicle frame means 12 through the connection of the hose end with the fitting 122.

In this regard it will be noted that the amount of hose that is moved by and with the movement of the vehicle frame means 12 increases as the vehicle frame means approaches the end of its path of movement. It will also be noted that since this movement is accomplished by winding up the cable 206 on the cable drum 256, the forward travel of the vehicle frame means will increase somewhat as a result of the increase in the length of the cable wound about the cable drum in each revolution. It is contemplated that the drag of the hose will tend to compensate for the increased speed of travel thus resulting in a substantially constant speed of movement of the device 10 along its entire path during the irrigation cycle. This compensation can be best controlled by an appropriate design of the cable drum. However, it would be possible to provide a feeler arm which senses the diameter of the cable wound about the cable drum and to adjust the flow control valve 236 in response to the position of the cable diameter sensing arm to insure a compensating decrease in the rotation speed of the cable drum as the diameter of the wound up cable increases.

Anchored to the cable 206 adjacent the end E is a stop element 312. When the device 10 approaches the end position, indicated at E, in its movement along the path of the irrigation cycle, lever 278 will engage the stop 312 and be pivoted in a clockwise direction as viewed in FIGURE 6. This movement of the lever 278 in turn moves the spring pressed actuating lever 282 into its operative position opening valve 284. The opening of valve 284 connects water under pressure with the line 290 which shuts off the engine 124 through the actuation of piston and cylinder unit 294 and shuts off the flow of water to the sprinkler means 18 by actuating pilot pressure operated valve 292.

In the manner set forth above the present device is operative to shut itself off when it has reached the end of its irrigation cycle. In order to move the device 10 to a new area to be sprinkler-irrigated it is necessary merely for the operator to drive out to the source S and uncouple the hose therefrom. The operator then drives the tractor T to the device 10, starts the internal combustion engine 124 and then moves the belt tightening assembly 146 into its operative position, as shown in full lines in FIGURE 4. The movement of the belt tightening magazine into its operative position serves to impart power driven rotational movement to the hose reel means 20. If necessary, lever 198 is moved into its dotted line position as shown in FIGURE 5 so as to position the moveable roller 176 adjacent the roller 172 and apply a squeezing action to the hose as it is wound up by the rotation of the hose reel means.

In this regard, it will be noted that the pipe section 98 is mounted so as to have a swivel action with respect to the hose reel. This swivel action insures that is the rotation of the hose reel commences, the pull of the hose as the first arcuate surface 80 engages therewith will be distributed to the hose fitting 122 in a substantially symmetrical manner. This symmetrical pulling action is of considerable importance when dealing with large diameter hose of the order of 4" or the like. This is particularly true where the contour of the ground is such that water in the hose will not run out by gravity when the hose end is disconnected from the source. Under these circumstances, the initial rotational movement of the hose reel is resisted by the entire load of the filled hose which is in excess of 2,000 pounds and this load is transmitted almost entirely to the hose fitting 122 connected with the swivel pipe section 98. Since the fitting 122 by virtue of the swivel action of the pipe section 98, is allowed to seek a position of equilibrium, the pull of the hose 14 on the fiitting 122 is symmetrical and is not concentrated at one edge portion, such as would be the case if the fitting was fixed with respect to the hub structure of the hose reel means. it will be understood that the initial turn of the hose engages the annularly arranged surfaces 80 and upon continued rotation the hose, in a generally collapsed condition substantially free of contained water, is wound up in single coil formation around the hub structure between the side structures of the hose reel means 20. When the hose 14 has been substantially entirely wound about the hose reel, the engine 124 is shut off, the cable 206 is disengaged from the ground anchor and the device 10 is ready to be transported by the tractor T to a new area to be sprinkler irrigated. It will be noted that since the drag of the hose provides a substantial amount of the pull on the cable, when the hose has been entirely wound up on the reel the cable is no longer under great tension and may be easily disengaged from the ground anchor.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles.

I claim:
1. A sprinkler irrigation device comprising:

vehicle frame means operable during a cycle of sprinkler irrigation in an area to be sprinkler irrigated, such as an agricultural field or the like, to be moved along a path including a first portion generally toward a substantially centrally located source of water under pressure in said area and a second portion away from the water source in generally the same direction;

means operatively associated with said vehicle frame means for effecting guided movement thereof along said path during an irrigation cycle;

a section of flexible, collapsible hose of a length to extend from the water source to said vehicle frame means when the latter is disposed at either end of said path;

conduit means carried by said vehicle frame means having a generally horizontally extending inlet opening;

means for detachably connecting one end of said hose in communication with the water source;

means for connecting the opposite end of said hose in communication with the inlet opening of said conduit means;

sprinkler means carried by said vehicle frame means in communication with said conduit means operable during an irrigation cycle to distribut water flowing into said conduit means through said hose, extending from the water source and to said inlet opening in the direction of movement of said vehicle frame means, onto the area to be sprinkler irrigated;

hose reel means mounted on said vehicle frame means for rotation about a generally vertical axis around which said hose is adapted to be wound in a generally collapsed condition substantially free of contained water after an irrigation cycle has been completed in one area so as to permit said hose to be conveniently carried on said vehicle frame means for transport therewith to another area to be sprinkler irrigated;

said hose reel mans comprising a central hub structure including annularly arranged means for receiving an initial loop of said hose and upper and lower side structures for maintaining the hose in single coil formation about said hub structure;

the inlet opening of said conduit means being disposed inwardly of the annular arranged means of said hub structure and in a vertical position disposed between said side structures;

means mounting the inlet opening of said conduit means for swinging movement about a generally vertical axis into a position facing in a direction to pull the opposite end of the hose connection therewith in the direction of movement of said vehicle frame along said path during an irrigation cycle and for movement with said hose reel means while connected with said opposite hose end during the rotation of the hose reel means to wind the hose thereon after the irrigation cycle has been completed and the hose has been disconnected from the water source; and power operated means carried by said vehicle frame means operatively connected with said hose reel means for effecting rotation of the latter to wind up the hose thereon in said generally collapsed condition substantially free of contained water.

2. A sprinkler irrigation device as defined in claim 1, wherein the inlet opening of said conduit means is provided in a pipe section mounted for rotation about an axis concentric with the axis of rotation of said hose reel means independent of the latter.

3. A sprinkler irrigation device as defined in claim 2 wherein said conduit means further includes an upper vertical pipe section extending upwardly from said first mentioned pipe section, said sprinkler means comprising a step-by-step rotary sprinkler head carried by the upper end of said upper pipe section.

4. A sprinkler irrigation device as defined in claim 1 wherein said vehicle frame means includes wheel means supporting the same for movement over the area to be sprinkler irrigated and a draft tongue connected to the end of the vehicle frame means disposed rearwardly with respect to the direction of movement during the irrigation cycle.

5. A sprinkler irrigation device as defined in claim 4 wherein said wheel means includes a pair of rear ground engaging wheels, and a transverse wheel carrying member mounted on the forward end of said vehicle frame means for tilting movement about a central longitudinally extending horizontal axis and a front ground engaging caster wheel carried at each end of said wheel carrying member.

6. A sprinkler irrigation device as defined in claim 1 including a hose guiding and collapsing assembly carried by the rear end portion of said vehicle frame means through which said hose extends, said hose guiding and collapsing assembly including a pair of cooperating rollers mounted for rotation about parallel vertical axes on opposite sides of said hose and for horizontal sliding movement with respect to each other in a direction toward and away from each other, and means for effecting said relative movement toward and away from each other between a first position wherein said rollers are spaced about a distance sufficient to receive therebetween the hose with water under pressure therein and a second position wherein said rollers are resiliently biased together to collapse the hose therebetween.

7. A sprinkler irrigation device as defined in claim 1 including hose payout roller means and means for mounting said hose payout roller means in a position spaced laterally outwardly from the rear end portion of said vehicle frame means.

8. A sprinkler irrigation device as defined in claim 1 wherein said power operated means comprises an internal combustion engine and a motion transmitting mechanism between said engine and said hose reel means, said motion transmitting mechanism including a belt and pulley assembly and a belt tightener assembly operatively connected with said belt and pulley assembly operable in one position to drivingly engage said engine with said hose reel means and in another position to permit controlled frictional rotation of said hose reel means with respect to said engine.

9. A sprinkler irrigation device as defined in claim 8 wherein said motion transmitting mechanism further includes a pininon carried by said vehicle frame means for rotation by said internal combustion engine in response to the movement of said belt tightener assembly into said one position and a crown gear fixed in depending relation to the lower side structure of said hose reel means meshing with said pinion.

10. A sprinkler irrigation device as defined in claim 1 wherein said mean for effecting guided movement of said vehicle frame means comprises a length of cable having one end adapted to be anchored to the area to be sprinkler irrigated, a cable drum assembly rotatably carried by said vehicle frame around which said cable is wound in response to rotation in one direction, a hydraulic motor operatively connected with said cable drum assembly for effecting rotation of the latter in said one direction and a power driven hydraulic pump hydraulically connected with said hydraulic motor for driving the latter.

11. A sprinkler irrigation device as defined in claim 10 wherein said power operated means includes an internal combustion engine and further including means for drivingly connecting said internal combustion engine with said hydraulic pump.

12. A sprinkler irrigation device as defined in claim 11 including a hydraulic control valve hydraulically connected between said hydrapulic pump and said hydraulic motor for movement between an operative position directing the hydraulic fluid from said pump through said hydraulic motor to drive the latter and in inoperative position by passing the hydraulic fluid from said pump away from said hydraulic motor and means for moving said control valve into said operative position in response to the flow of water under pressure into said conduit means.

13. A sprinkler irrigation device as defined in claim 12 including a normally open shut off valve in said conduit means operable in response to the communication of water pilot pressure therewith to shut off the flow of water under pressure through said conduit means and out of said sprinkler means, a normally closed trip valve carried by said vehicle frame means in a position to be moved into an open position in response to the engagement of an abutment fixed to the cable adjacent the anchored end thereof, means for communicating one side of said trip valve with said conduit means upstream of said shut off valve and means for communicating the opposite side of said trip valve with said shut off valve to provide water pilot pressure to close the same in response to the opening of said trip valve and water pressure responsive means communicating with the opposite side of said trip valve for discontinuing the operation of said internal combustion engine in response to the opening of said trip valve.

14. A method of deploying a wheeled sprinkler irrigation device for movement along an elongated predetermined path in a sprinkler irrigation cycle by means of a cable and cable drum assembly during which a source of water under pressure is communicated with sprinkler means on the device by a length of flexible collapsible hose, said method comprising the steps of:

towing the wheeled device with a towing vehicle to the end of said predetermined path with the device oriented behind the towing vehicle in its intended direction of movement along said predetermined path, with the cable wound up on the cable drum and with the hose wound up on a hose reel on the device in a generally collapsed condition substantially free of contained water with its inner end connected in communication with the sprinkler means;

anchoring the free end of said cable to the ground at a position adjacent the end of said predetermined path;

towing the device along said path toward the water source in a direction opposed to the direction of movement during the irrigation cycle but with the device oriented in the direction of the latter while paying out said cable from the cable drum assembly;

stopping the last-mentioned towing movement adjacent the source and connecting the outer end of the hose to the source;

resuming the last-mentioned towing movement along said predetermined path away from the source and toward the beginning thereof while continuing to pay out said cable from the cable drum and while paying out the hose from the hose reel on the ground alongside said predetermined path; and stopping the last-mentioned towing movement when said device has reached the beginning of said predetermined path and disconnecting the towing vehicle therefrom leaving the device properly oriented in its direction of movement along said predetermined path and the inner end of the hose connected in communication with said sprinkler means.

15. A method as defined in claim 14 including the step of commencing the irrigation cycle by communicating the source of water under pressure with said hose.

References Cited

UNITED STATES PATENTS

| | | | |
|---|---|---|---|
| 2,880,937 | 4/1959 | King | 239—184 X |
| 3,043,520 | 7/1962 | Nelson | 239—189 |
| 3,128,047 | 4/1964 | Rogers | 239—191 |
| 3,235,009 | 2/1966 | Nelson | 239—184 X |
| 3,246,848 | 4/1966 | Bowers | 239—199 X |

ALLEN N. KNOWLES, Primary Examiner

U.S. Cl. X.R.

239—184, 189, 191, 197, 199